United States Patent
Hermansson

(10) Patent No.: US 9,677,683 B2
(45) Date of Patent: Jun. 13, 2017

(54) SOLENOID VALVE ASSEMBLY FOR A SEAT OF A VEHICLE

(75) Inventor: Bengt Hermansson, Mullsjö (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 199 days.

(21) Appl. No.: 14/233,656

(22) PCT Filed: Jul. 20, 2011

(86) PCT No.: PCT/IB2011/001702
§ 371 (c)(1),
(2), (4) Date: Jan. 17, 2014

(87) PCT Pub. No.: WO2013/011340
PCT Pub. Date: Jan. 24, 2013

(65) Prior Publication Data
US 2014/0191549 A1 Jul. 10, 2014

(51) Int. Cl.
*F16K 31/06* (2006.01)
*B60N 2/70* (2006.01)
(Continued)

(52) U.S. Cl.
CPC ........ *F16K 31/0696* (2013.01); *B60N 2/4415* (2013.01); *B60N 2/7082* (2013.01);
(Continued)

(58) Field of Classification Search
CPC .. F16K 31/06; F16K 31/0686; F16K 31/0658; H01F 7/088; H01F 7/1607
(Continued)

(56) References Cited

U.S. PATENT DOCUMENTS 3,446,473 A 5/1969 Barker
4,072,919 A 2/1978 Clary
(Continued)

FOREIGN PATENT DOCUMENTS

DE 19905176 A1 8/2000
EP 2045496 A1 4/2009
(Continued)

OTHER PUBLICATIONS

Machine Assisted English Translation of abstract, 2 pages; Machine Assisted English Translation of EP2045496 A1, extracted from espacenet.com database on Jan. 13, 2014; 14 pages; European Patent No. EP2045496 A1, 22 Pages.
(Continued)

*Primary Examiner* — Michael R Reid
*Assistant Examiner* — Christopher Ballman
(74) *Attorney, Agent, or Firm* — Howard & Howard Attorneys PLLC

(57) ABSTRACT

The present invention provides for a solenoid valve assembly including a housing (32) defining a cavity (34). A support (48) is disposed in the cavity and defines a bore (50). A coil (60) is disposed about the support and defines an energized state for generating a magnetic field and a de-energized state. A plunger (74) is movably disposed in the bore of the support between a first position engaging the housing and a second position spaced from the housing. The plunger is radially spaced from the support to define a gap (76) between the plunger and the support. A dampener (86) is coupled to one of the support and the plunger adjacent the gap to prevent direct engagement between the support and the plunger as the plunger moves between the first and second positions during the energized and de-energized states for reducing noise during operation.

22 Claims, 10 Drawing Sheets

(51) Int. Cl.
  *F16K 27/02*    (2006.01)
  *H01F 7/08*     (2006.01)
  *H01F 7/16*     (2006.01)
  *B60N 2/44*     (2006.01)

(52) U.S. Cl.
  CPC ........ *F16K 27/029* (2013.01); *F16K 31/0658* (2013.01); *F16K 31/0686* (2013.01); *H01F 7/088* (2013.01); *H01F 7/1607* (2013.01)

(58) Field of Classification Search
  USPC .................................................... 251/129.15
  See application file for complete search history.

(56) References Cited

U.S. PATENT DOCUMENTS

| | | | | |
|---|---|---|---|---|
| 4,611,632 | A | * | 9/1986 | Kolchinsky ......... F15B 13/0402 137/625.65 |
| 5,150,879 | A | * | 9/1992 | Mullally .................. F02K 9/58 251/129.15 |
| 5,300,908 | A | | 4/1994 | Stone et al. |
| 5,663,700 | A | | 9/1997 | Spence et al. |
| 5,967,608 | A | | 10/1999 | Van Sickle |
| 6,105,616 | A | * | 8/2000 | Sturman ............... F15B 13/044 137/625.65 |
| 6,225,886 | B1 | | 5/2001 | Kleinert et al. |
| 6,279,524 | B1 | | 8/2001 | Schebitz |
| 6,595,485 | B2 | | 7/2003 | Burrola et al. |
| 6,935,612 | B2 | | 8/2005 | McCombs et al. |
| 2007/0069165 | A1 | | 3/2007 | Hess et al. |
| 2008/0224805 | A1 | | 9/2008 | Becker et al. |

FOREIGN PATENT DOCUMENTS

| | | |
|---|---|---|
| FR | 2761447 A1 | 10/1998 |
| KR | 20060006405 A | 1/2006 |
| WO | WO 2007088043 A1 | 8/2007 |

OTHER PUBLICATIONS

Machine Assisted English Translation of abstract, 2 pages; Machine Assisted English Translation of DE 19905176 A1, extracted from espacenet.com database on Jan. 13, 2014; 7 pages; German Patent No. DE 19905176 A1, 6 Pages.

Machine Assisted English Translation abstract, 1 page; Machine Assisted English Translation of WO 2007/088043 A1, extracted from espacenet.com database on Jan. 13, 2014; 8 Pages; PCT Publication No. WO 2007/08840 A1, 23 Pages.

International Search Report Dated Mar. 16, 2012, 3 Pages.

Machine Assisted English Translation abstract, 1 page; Machine Assisted English Translation of FR2761447, extracted from espacenet.com database on Feb. 4, 2014; 8 Pages; French Patent No. FR 2761447, 16 Pages.

Machine Assisted English Translation of KR20060006405, extracted from espacenet.com database on Mar. 7, 2014; 2 Pages; Korean Patent No. KR20060006405; 5 Pages.

* cited by examiner

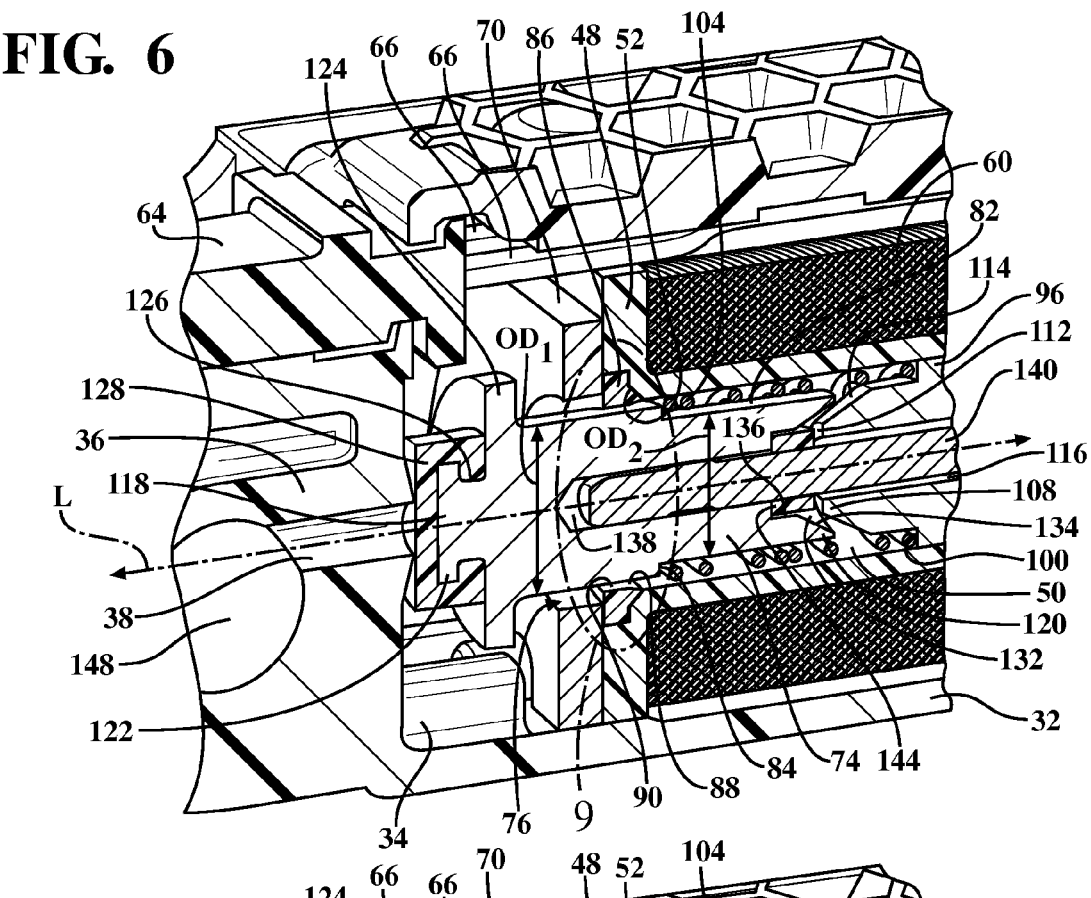
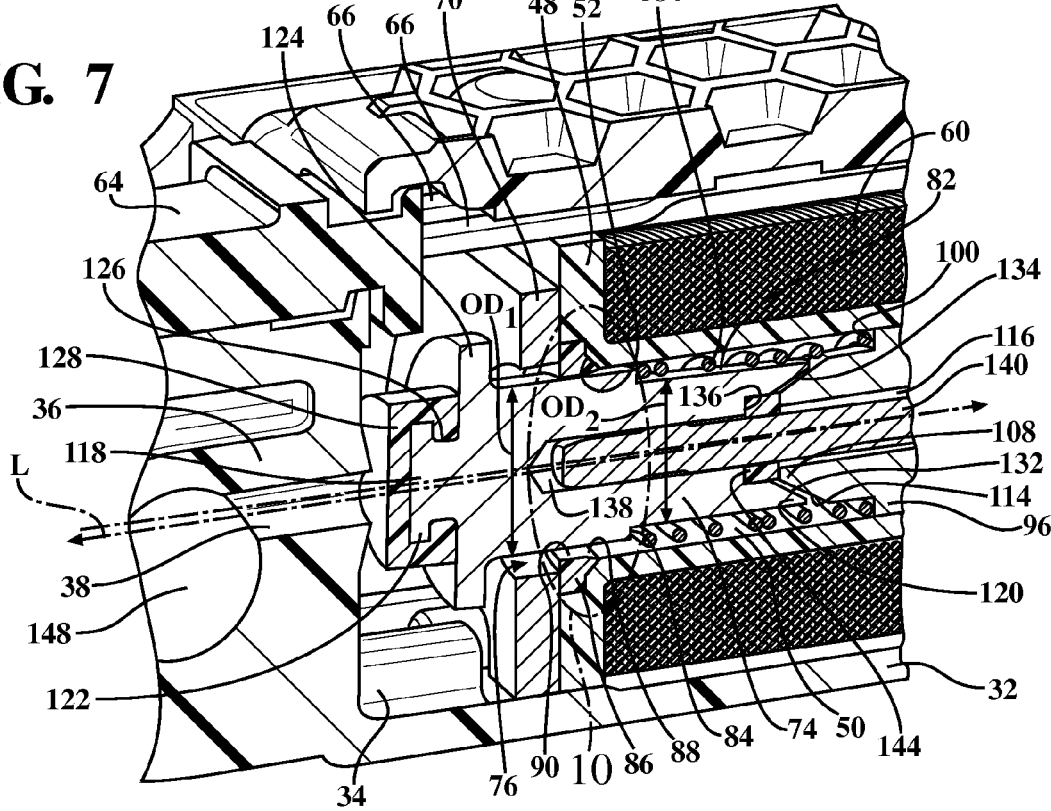

SOLENOID VALVE ASSEMBLY FOR A SEAT OF A VEHICLE

RELATED APPLICATIONS

This application is the National Stage of International Patent Application No. PCT/IB2011/001702, filed on Jul. 20, 2011, the content of which is incorporated herein by reference.

BACKGROUND OF THE INVENTION

1. Field of the Invention

The present invention relates to a seat assembly for a vehicle, and more specifically to a solenoid valve assembly for a seat of a vehicle.

2. Description of the Related Art

Solenoids are known in the art. Some solenoids include a plunger movable in response to a magnetic field. A common problem with solenoids having plungers is undesired noise. Therefore, various designs have been developed to try to reduce undesirable noise. For example, one such type of solenoid is disclosed in U.S. Pat. No. 5,663,700 (the '700 patent) to Spence et al. The '700 patent discloses a solenoid including a plunger movable through a tube. A pair of wear bands are disposed about a periphery of the plunger. The wear bands form a seal with a tube wall of the tube. As such, the wear bands engage the tube wall as the plunger moves which creates frictional forces that must be overcome to move the plunger to a desired position. Further, movement of the plunger is reduced due to the frictional forces. In addition, an air bleed passage in the wear bands allow air to pass therethrough which decreases acceleration of the plunger, and thus delays movement of the plunger to the desired position.

Therefore, there remains an opportunity to develop a seat assembly and a solenoid valve assembly.

SUMMARY OF THE INVENTION

The present invention provides for a solenoid valve assembly including a housing defining a cavity and a support disposed in the cavity. The support defines a bore along a longitudinal axis. The solenoid valve assembly further includes a coil disposed about the support and defining an energized state for generating a magnetic field and a de-energized state. The solenoid valve assembly also includes a plunger movably disposed in the bore of the support between a first position engaging the housing and a second position spaced from the housing. The plunger is radially spaced from the support relative to the longitudinal axis to define a gap between the plunger and the support. The solenoid valve assembly further includes a dampener coupled to one of the support and the plunger adjacent the gap to prevent direct engagement between the support and the plunger as the plunger moves between the first and second positions during the energized and de-energized states for reducing noise during operation.

Therefore, the present invention provides for a first dampener preventing direct engagement between the support and the plunger as the plunger moves for reducing noise during movement of the plunger. In addition, the first dampener prevents direct engagement between the support and the plunger as the plunger moves for maintaining a gap between the plunger and the support which allows the plunger to move more freely than the plunger design as discussed in the Background of the Invention section.

BRIEF DESCRIPTION OF THE DRAWINGS

Advantages of the present invention will be readily appreciated, as the same becomes better understood by reference to the following detailed description, when considered in connection with the accompanying drawings.

FIG. 6 is a perspective cross-sectional view of the first plunger in the first position.

FIG. 7 is a perspective cross-sectional view of the first plunger in a second position.

DETAILED DESCRIPTION OF THE INVENTION

Figure 1:
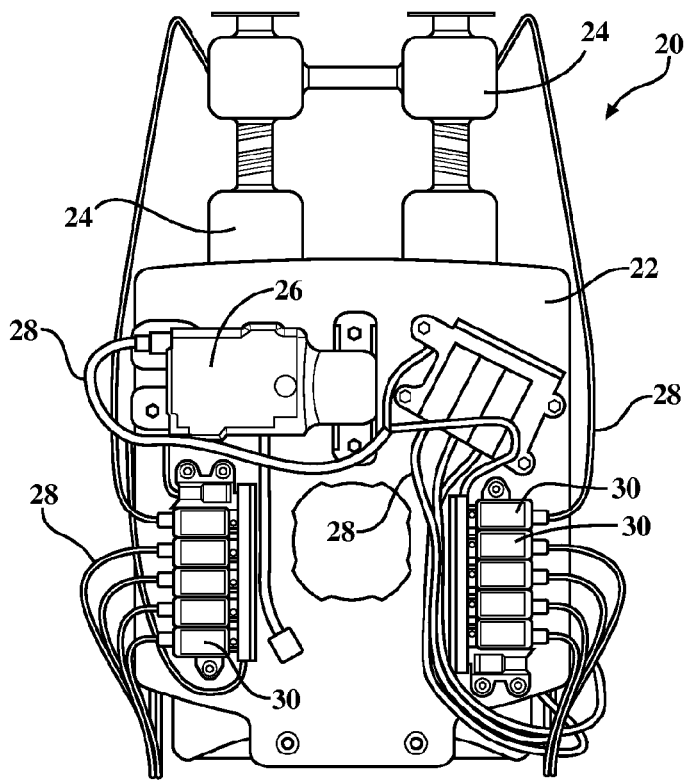
FIG. 1 is a back view of a seat assembly including a seat frame and a plurality of solenoid valve assemblies coupled to the seat frame.

Referring to the Figures, wherein like numerals indicate like or corresponding parts throughout the several views, a seat assembly 20 for a vehicle (not shown) is generally shown in FIG. 1.

Figure 2:
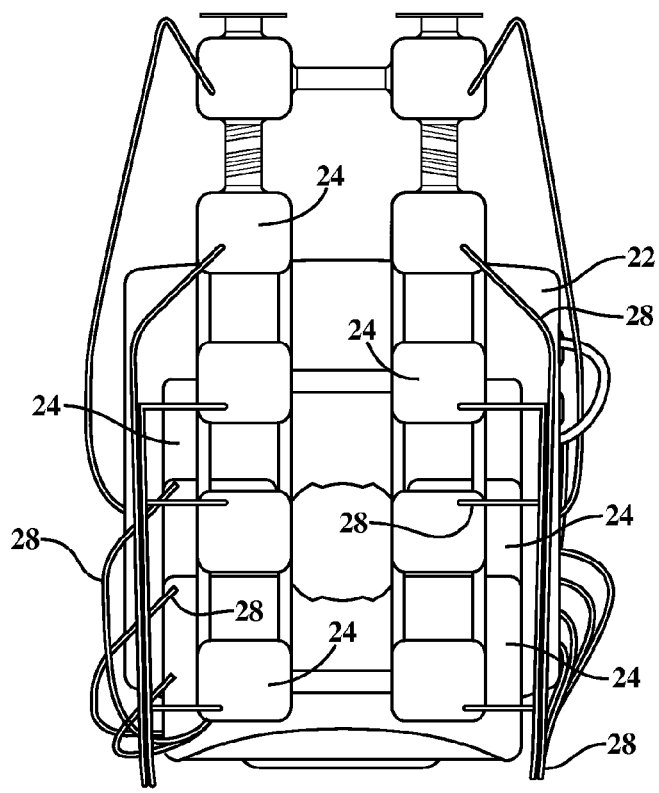
FIG. 2 is a front view of the seat frame with a plurality of bladders coupled to the seat frame.
Figure 3:
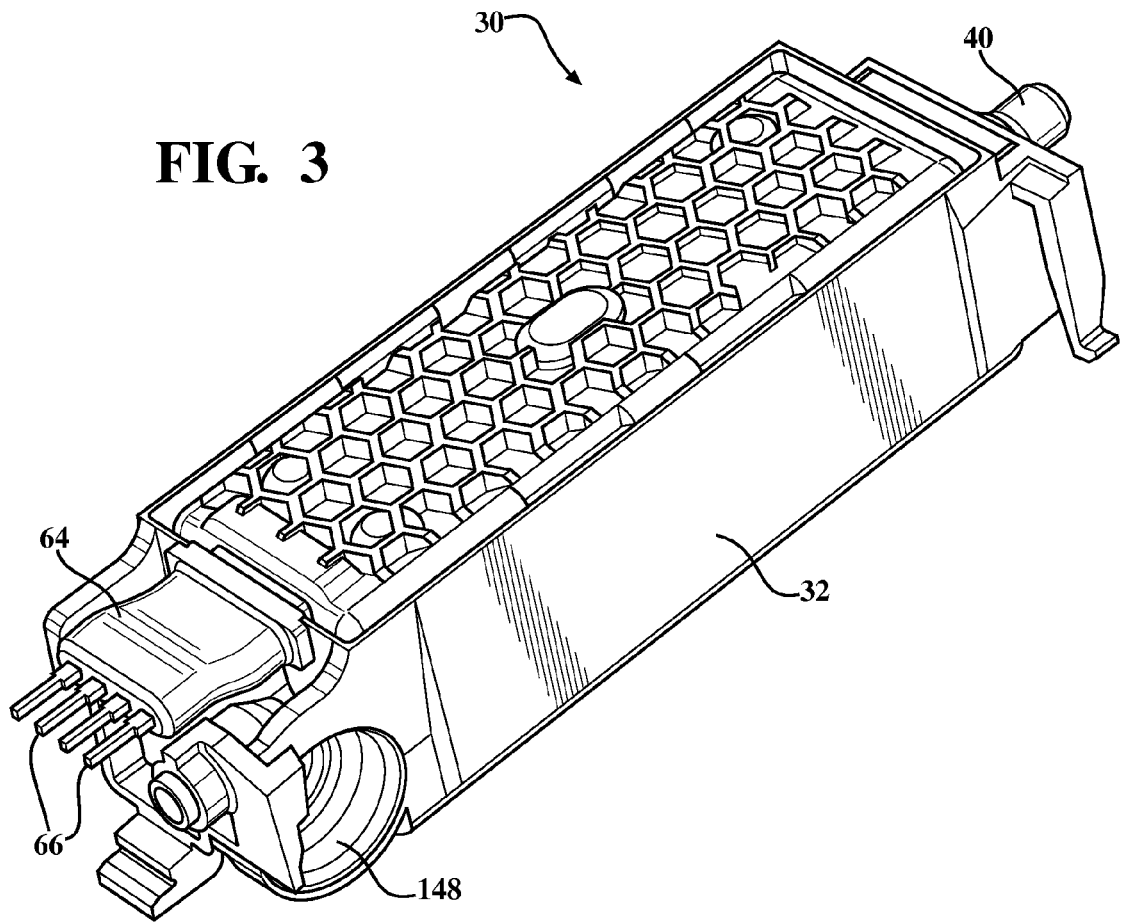
FIG. 3 is a perspective view of the solenoid valve assembly.
Figure 4:
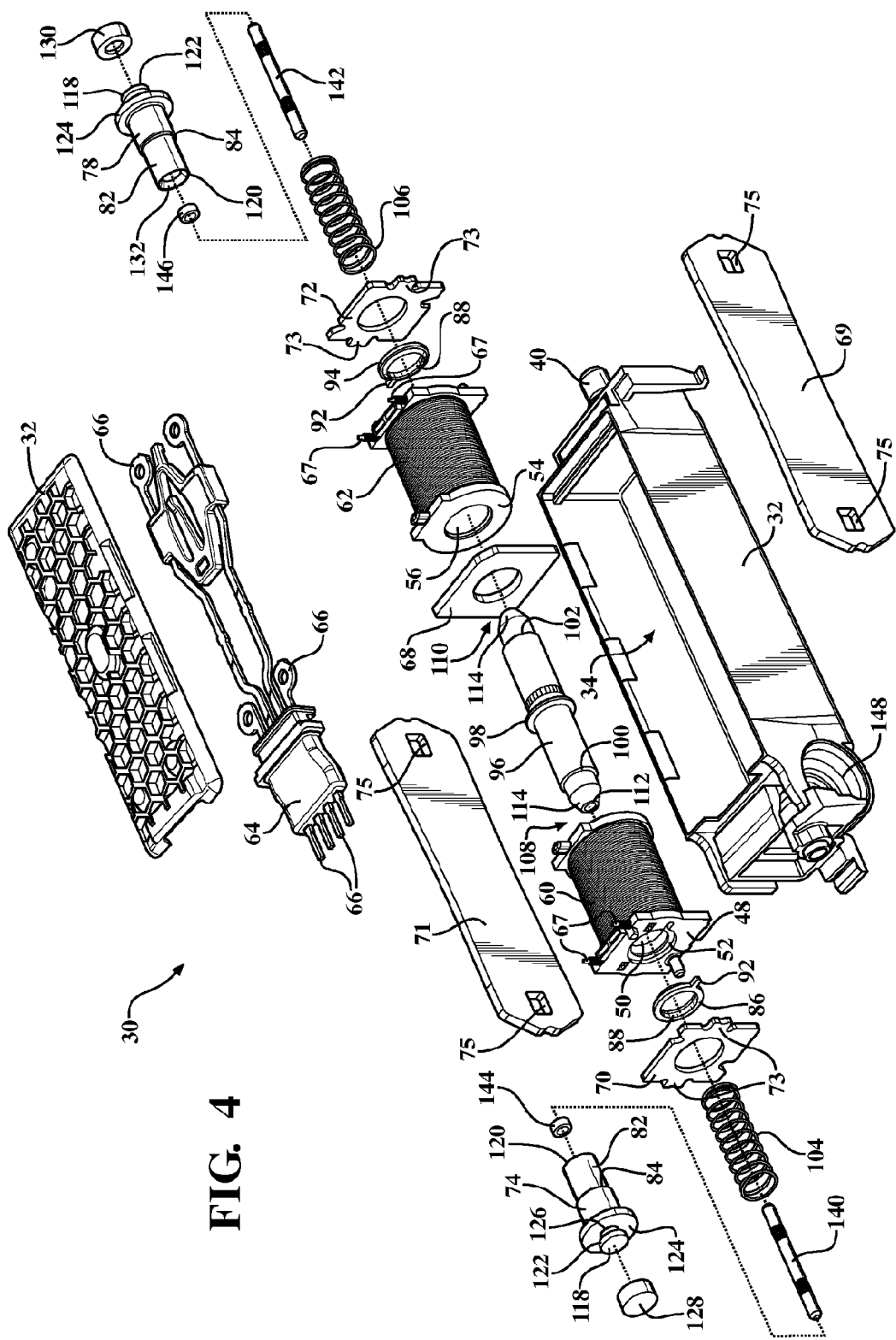
FIG. 4 is an exploded view of the solenoid valve assembly.
Figure 4A:
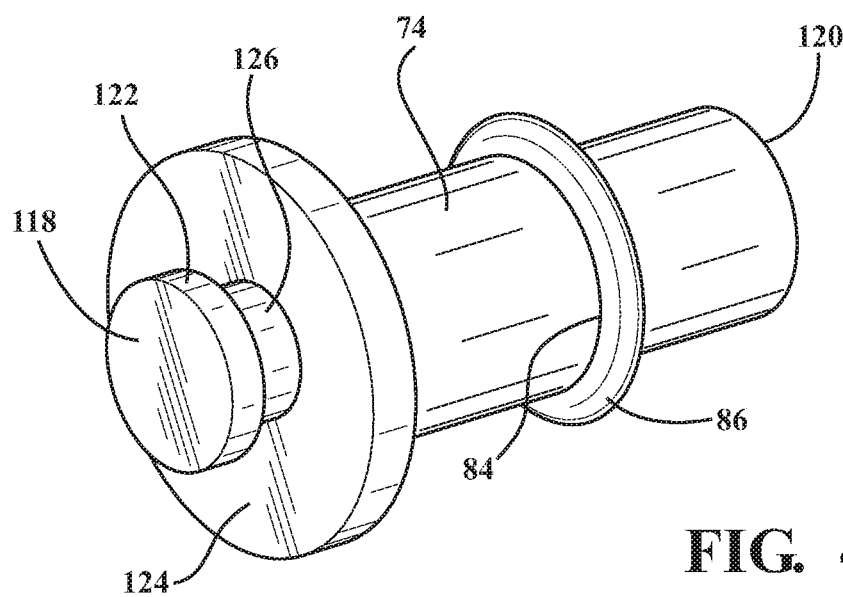
FIG. 4A is a perspective view of a dampener coupled to a plunger.
Figure 5:
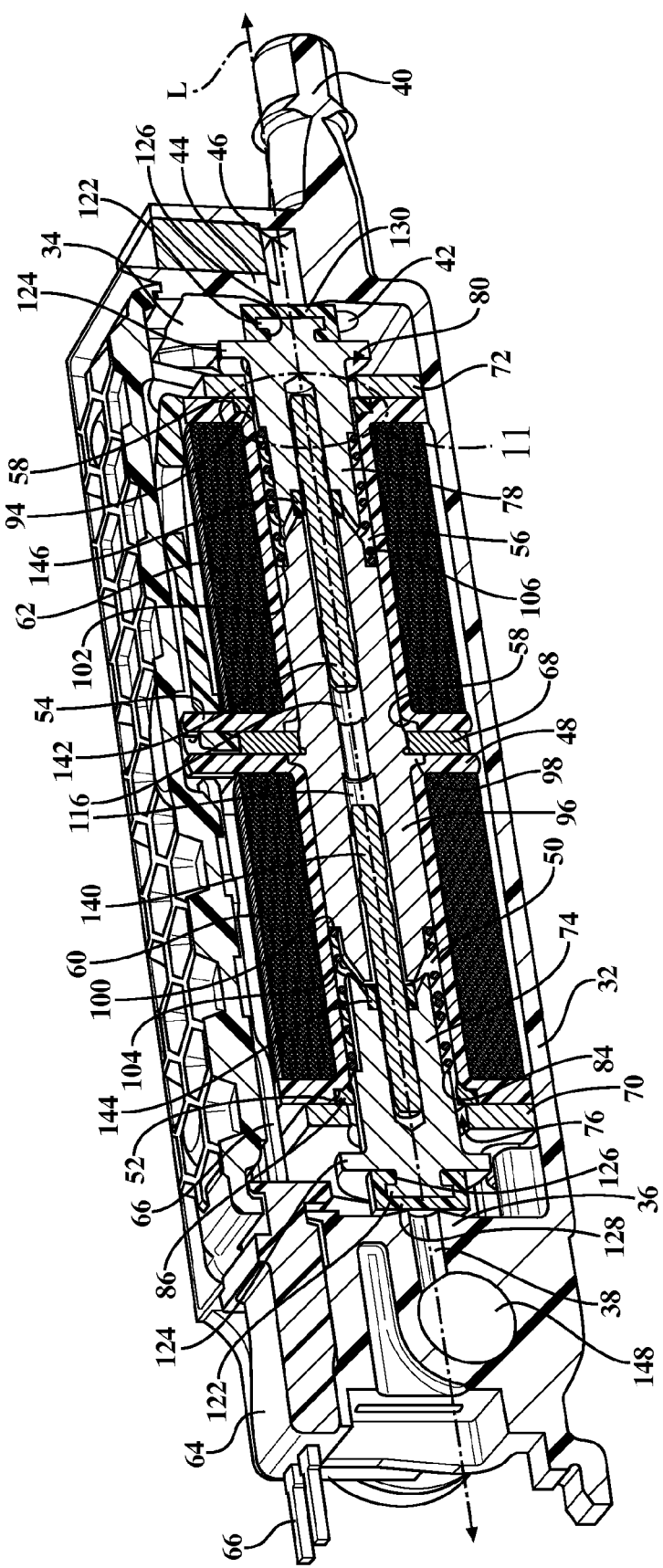
FIG. 5 is a perspective cross-sectional view of the solenoid valve assembly including a first plunger in a first position and a second plunger in a third position.

Also referring to FIG. 2, the seat assembly 20 includes a seat frame 22. The seat assembly 20 can include a seat with the seat frame 22 disposed in the seat. More specifically, the seat can include a back portion for supporting a user's back and a bottom portion for supporting the user's legs. The seat frame 22 can be disposed in the back portion and/or the bottom portion of the seat. It is to be appreciated that the seat frame 22 can be any suitable configuration.

The seat assembly 20 includes a bladder 24 coupled to the seat frame 22. The bladder 24 defines an inflate position with the bladder 24 inflated and a deflate position with the bladder 24 deflated. It is to be appreciated that the bladder 24 can be partially inflated and partially deflated. Hence, the inflate position is defined as the bladder 24 being partially inflated or fully inflated and the deflate position is defined as the bladder 24 being partially deflated or fully deflated. It is to be appreciated that the bladder 24 can be coupled to the seat frame 22, the back portion, the bottom portion, or any other suitable location of the seat.

The seat assembly 20 can further include a pump 26 mounted to the seat frame 22 for supplying fluid to the bladder 24 to inflate the bladder 24 to the inflate position. The pump 26 is activated for supplying fluid to the bladder 24. The fluid can be defined as air or any other suitable fluid. A plurality of tubes 28 can be utilized to couple together various components for guiding the fluid from the pump 26. For example, tube(s) 28 can be coupled to the bladder 24 and/or the pump 26 for guiding the fluid from the pump 26 to the bladder 24.

Referring to FIGS. 1 and 3-5, the seat assembly 20 further includes a solenoid valve assembly 30 mounted to the seat frame 22 and coupled to the bladder 24. Hence, the solenoid valve assembly 30 can be for the seat of the vehicle. The solenoid valve assembly 30 controls the flow of the fluid to the bladder 24. In other words, the solenoid valve assembly 30 controls when the bladder 24 is inflated to the inflate position and when the bladder 24 is deflated to the deflate position. Further, the solenoid valve assembly 30 controls when the bladder 24 is partially inflated and partially deflated.

The solenoid valve assembly 30 includes a housing 32 defining a cavity 34. The housing 32 is mounted to the seat frame 22 for securing the solenoid valve assembly 30 to the seat frame 22. Further, the bladder 24 is coupled to the housing 32. In one embodiment, at least one of the tubes 28 is attached to the housing 32 and the bladder 24 such that the tube(s) 28 couples the housing 32 to the bladder 24. In another embodiment, the bladder 24 is attached directly to the housing 32.

The housing 32 includes a first port 36 defining a first aperture 38 adjacent the cavity 34. More specifically, the first aperture 38 is in fluid communication with the cavity 34. Fluid flows into the cavity 34 of the housing 32 through the first port 36. For example, at least one tube 28 is coupled to the first port 36 for guiding fluid from the pump 26 to the first port 36. As such, when a user desires to inflate the bladder 24, fluid is allowed to flow in through the first port 36 and into the cavity 34.

In addition, the housing 32 includes a second port 40 adjacent the cavity 34 and spaced from the first port 36. The bladder 24 is coupled to the second port 40 with the second port 40 defining a second aperture 42 in fluid communication with the cavity 34 and the bladder 24 for inflating the bladder 24 to the inflate position and deflating the bladder 24 to the deflate position. Hence, the first and second apertures 38, 42 are in fluid communication with each other. When utilizing the tube(s) 28, one end of one of the tube(s) 28 is attached to the second port 40 and another end of the tube 28 is attached to the bladder 24.

Further, the housing 32 includes a third port 44 defining a third aperture 46 adjacent the cavity 34. More specifically, the third aperture 46 is in fluid communication with the cavity 34. As such, the first, second, and third apertures 38, 42, 46 are in fluid communication with each other. Fluid flows out of the cavity 34 and out of the bladder 24 through the third port 44. For example, when the user desires to deflate the bladder 24, fluid is allowed to flow out of the cavity 34, the second port 40, and the third port 44.

The solenoid valve assembly 30 also includes a support 48 disposed in the cavity 34. The support 48 defines a bore 50 and a recess 52 spaced from the bore 50. The bore 50 is disposed along a longitudinal axis L with the recess 52 being radially spaced relative to the longitudinal axis L. The recess 52 can be further defined as a plurality of recesses 52 spaced from each other relative to the longitudinal axis L. Specifically, one of the recesses 52 can be disposed adjacent one end of the support 48 and another one of the recesses 52 can be disposed adjacent another end of the support 48. The support 48 is further defined as a first support 48, the bore 50 is further defined as a first bore 50, and the recess 52 is further defined as a first recess 52 and will be referred to as the first support 48, the first bore 50, and the first recess 52 for the following discussion.

The solenoid valve assembly 30 can further include a second support 54 disposed in the cavity 34 and adjacent the first support 48. The second support 54 defines a second bore 56 adjacent the first bore 50. More specifically, the first and second supports 48, 54 are spaced from each other and the second bore 56 is disposed along the longitudinal axis L. The second support 54 also defines a second recess 58 spaced from the second bore 56 with the second recess 58 being radially spaced relative to the longitudinal axis L. The second recess 58 can be further defined as a plurality of second recesses 58 spaced from each other relative to the longitudinal axis L. Specifically, one of the second recesses 58 can be disposed adjacent one end of the second support 54 and another one of the second recesses 58 can be disposed adjacent another end of the second support 54. It is to be appreciated that the first and second supports 48, 54 are mirror images of each other. It is to further be appreciated that the first and second supports 48, 54 can be different configurations from each other. It is to also be appreciated that the first and second supports 48, 54 can each be referred to as a bobbin as known to those skilled in the art.

The first and second supports 48, 54 can be formed of polymeric material(s) and more specifically non-electrical and non-magnetic material(s). In one embodiment, the polymeric material(s) of the first and second supports 48, 54 can be further defined as plastic. It is to be appreciated that the first and second supports 48, 54 can be formed of any suitable non-electrical and non-magnetic material(s).

In addition, the solenoid valve assembly 30 includes a coil 60 disposed about the first support 48 and defines an energized state for generating a magnetic field or magnetic flux and a de-energized state. The coil 60 is further defined as a first coil 60 and will be referred to as the first coil 60 in the following discussion. The solenoid valve assembly 30 can further include a second coil 62 disposed about the second support 54 and defines an energized state for generating a magnetic field and a de-energized state.

The first and second coils 60, 62 can be formed of metal material(s) and more specifically electrically conductive material(s). In one embodiment, the metal material(s) of the first and second coils 60, 62 can be further defined as copper. In another embodiment, the metal material(s) of the first and second coils 60, 62 can be further defined as an alloy. Suitable alloys for the first and second coils 60, 62 include aluminum. It is to be appreciated that the first and second coils 60, 62 can be formed of any suitable conductive material(s) for generating the magnetic fields.

The solenoid valve assembly 30 can also include a plug 64 coupled to the housing 32 for providing current or electricity to the first and second coils 60, 62. More specifically, the plug 64 includes a plurality of wires 66 spaced from each other for providing current or electricity to the first and second coils 60, 62 to generate the magnetic field for the energized state. Specifically, a pair of wires 66 are coupled to the first coil 60 and another pair of wires 66 are coupled to the second coil 62. The first and second coils 60, 62 are in the de-energized state when no current flows through the first and second coils 60, 62.

A plurality of posts 67 extend from the first and second supports 48, 54 with one wire 66 coupled to each of the posts 67 for providing current or electricity to the first and second coils 60, 62. More specifically, a pair of posts 67 extend from the first support 48 and another pair of posts 67 extend from the second support 54. As such, one pair of wires 66 are coupled to the pair of posts 67 of the first support 48 and another pair of wires 66 are coupled to the pair of posts 67 of the second support 54. The wires 66 can be attached to the first and second coils 60, 62, and more specifically, the posts 67, by soldering, clamping, press-fit, fasteners, and/or any other suitable method.

The solenoid valve assembly 30 can further include a center plate 68 disposed between the first and second supports 48, 54. Further, the center plate 68 is disposed between the first and second coils 60, 62. The center plate 68 guides the magnetic field when the first and/or second coils 60, 62 are in the energized state. The center plate 68 can be any suitable configuration. The center plate 68 can be formed of metal material(s) and more specifically magnetic material(s). In one embodiment, the metal material(s) of the center plate 68 is further defined as steel. It is to be appreciated that the center plate 68 can be formed of any suitable magnetic material(s).

Figure 13:
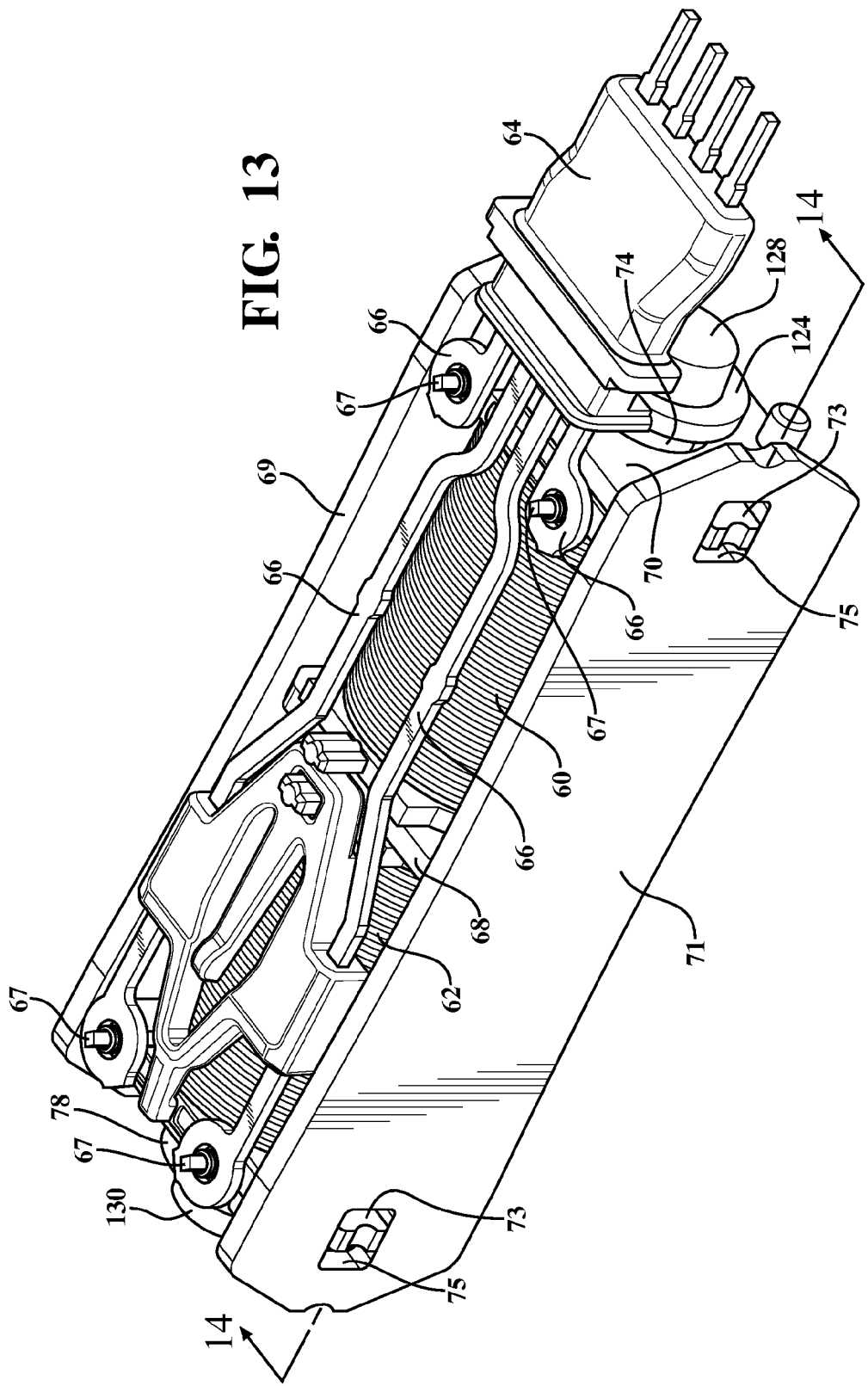
FIG. 13 is a perspective view of the solenoid valve assembly with a housing removed.
Figure 14:
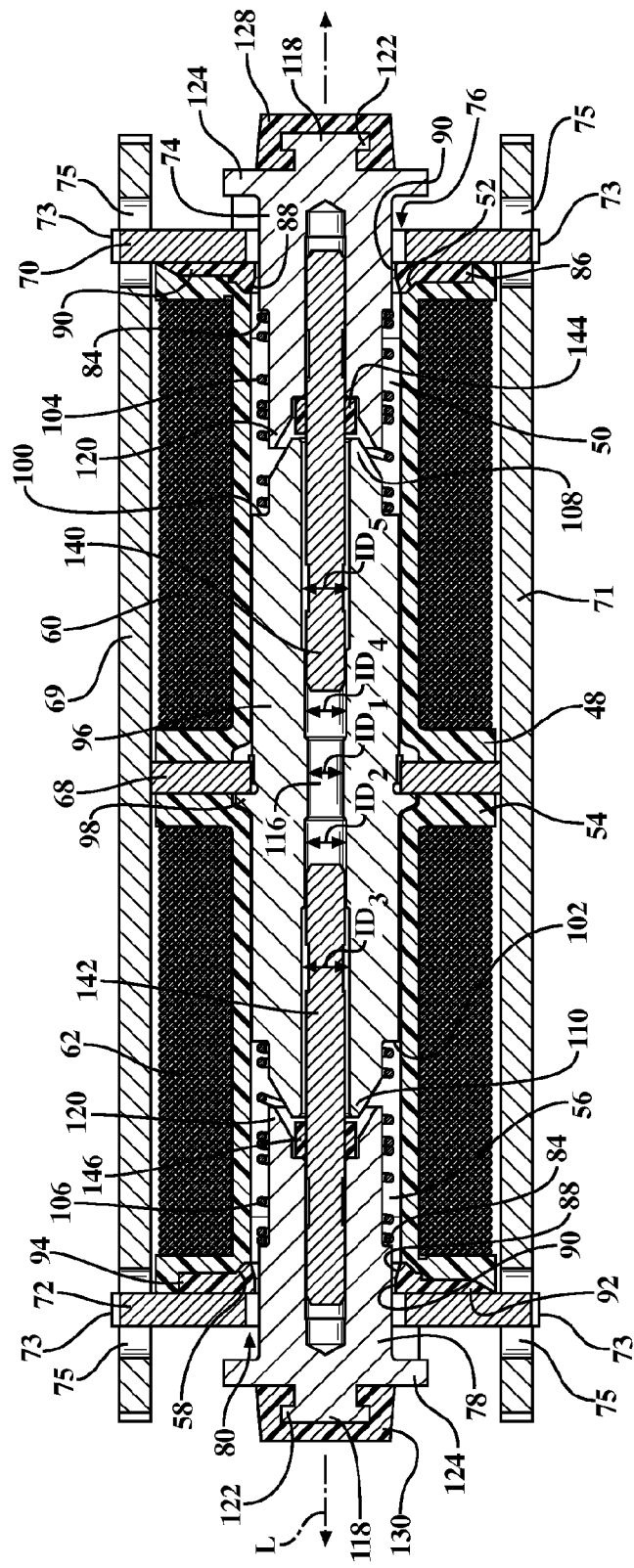
FIG. 14 is a cross-sectional view of the solenoid valve assembly taken from lines 14-14 of FIG. 13.

Also referring to FIGS. 13 and 14, the solenoid valve assembly 30 can also include a first plate 69 and a second plate 71 spaced from each other and disposed in the cavity 34 of the housing 32. The first and second plates 69, 71 guide the magnetic field when the first and/or second coils 60, 62 are in the energized state. The first and second supports 48, 54, as well as the first and second coils 60, 62, are disposed between the first and second plates 69, 71. More specifically, the first and second plates 69, 71 are spaced from each other transverse to the longitudinal axis L. The center plate 68 is disposed between the first and second plates 69, 71 such that one edge of the center plate 68 abuts the first plate 69 and another edge of the center plate 69 abuts the second plate 71. As such, the center plate 68 and the first and second plates 69, 71 cooperate to guide the magnetic field when the first and/or second coils 60, 62 are in the energized state. It is to be appreciated that the first and second plates 69, 71 are mirror images of each other. It is to further be appreciated that the first and second plates 69, 71 can be different configurations from each other.

The solenoid valve assembly 30 can also include a first bracket 70 adjacent the first support 48 and a second bracket 72 adjacent the second support 54. More specifically, the first bracket 70 is disposed between the housing 32 and the first support 48 and the second bracket 72 is disposed between the second support 54 and the housing 32. The first bracket 70 maintains the orientation or position of the first support 48 and the second bracket 72 maintains the orientation or position of the second support 54.

In addition, the first and second brackets 70, 72 attach to the first and second plates 69, 71. For example, the first and second brackets 70, 72 can each include a plurality of tags 73 extending therefrom for engaging the first and second plates 69, 71. Specifically, the first and second plates 69, 71 can define a plurality of cutouts 75 spaced from each other. The tags 73 engage the cutouts 75 for securing the first and second plates 69, 71 to the first and second brackets 70, 72. The first and second brackets 70, 72 also guide the magnetic field when the first and/or second coils 60, 62 are in the energized state. As such, the first and second brackets 70, 72, as well as the center plate 68 and the first and second plates 69, 71 cooperate to guide the magnetic field when the first and/or second coils 60, 62 are in the energized state. In other words, the first and second brackets 70, 72, as well as the center plate 68 and the first and second plates 69, 71 cooperate to guide the magnetic field when the first and/or second coils 60, 62 are in the energized state, thus providing a more effective solenoid valve assembly 30. It is to be appreciated that the first and second brackets 70, 72 are mirror images of each other. It is to further be appreciated that the first and second brackets 70, 72 can be different configurations from each other.

The first and second brackets 70, 72 can be formed of metal material(s) and more specifically magnetic material(s). In one embodiment, the metal material(s) of the first and second brackets 70, 72 is further defined as steel. It is to be appreciated that the first and second brackets 70, 72 can be formed of any suitable magnetic material(s).

Figure 9:
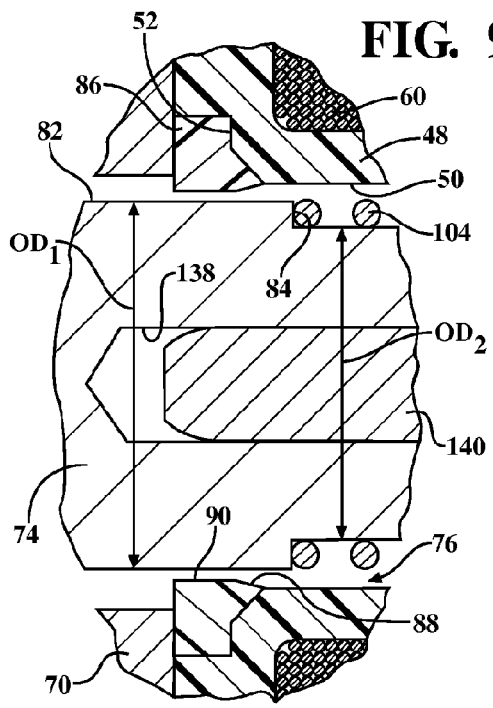
FIG. 9 is a cross-sectional view of the first plunger spaced from the first dampener taken from FIG. 6.

Further, the solenoid valve assembly 30 includes a plunger 74 movably disposed in the first bore 50 of the first support 48 between a first position engaging the housing 32 and a second position spaced from the housing 32. The plunger 74 is shown in the first position in FIGS. 5, 6, and 9 and the plunger 74 is shown in the second position in FIGS. 7 and 10. The plunger 74 prevents fluid communication between the cavity 34 and the first aperture 38 when in the first position and the plunger 74 allows fluid communication between the cavity 34 and the first aperture 38 when in the second position. As best shown in FIGS. 6 and 9, the plunger 74 is radially spaced from the first support 48 to define a gap 76 between the plunger 74 and the first support 48. Hence, the plunger 74 is radially spaced from the first support 48 relative to the longitudinal axis L. The plunger 74 is also radially spaced from the first bracket 70 such that the plunger 74 is movable through the first bracket 70 between the first and second positions. The plunger 74 is further defined as a first plunger 74 and the gap 76 is further defined as a first gap 76 and will be referred to as the first plunger 74 and the first gap 76 below.

Figure 11:
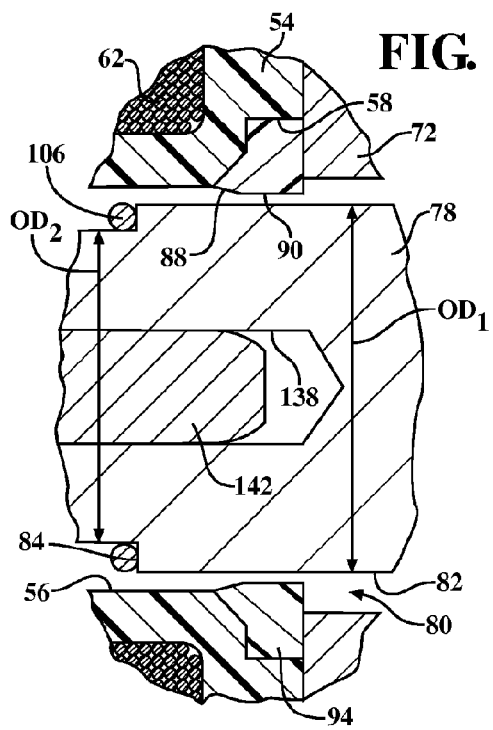
FIG. 11 is a cross-sectional view of the second plunger spaced from a second first dampener taken from FIG. 5.

Turning back to FIG. 5, the solenoid valve assembly 30 can further include a second plunger 78 movably disposed in the second bore 56 of the second support 54 between a third position engaging the housing 32 and a fourth position spaced from the housing 32. The second plunger 78 is shown in the third position in FIGS. 5 and 11 and the second plunger 78 is shown in the fourth position in FIGS. 8 and 12. As best shown in FIG. 11, the second plunger 78 is radially spaced from the second support 54 to define a second gap 80 between the second plunger 78 and the second support 54. In addition, the second plunger 78 is radially spaced from the second bracket 72 such that the second plunger 78 is movable through the second bracket 72 between the third and fourth positions. The second plunger 78 prevents fluid communication between the cavity 34 and the third aperture 46 when in the third position and the second plunger 78 allows fluid communication between the cavity 34 and the third aperture 46 when in the fourth position. It is to be appreciated that the first and second plungers 74, 78 are mirror images of each other. It is to further be appreciated that the first and second plungers 74, 78 can be different configurations from each other.

The first and second plungers 74, 78 can be formed of metal material(s) and more specifically, magnetic material(s). In one embodiment, the metal material(s) of the first and second plungers 74, 78 is further defined as steel. It is to be appreciated that the first and second plungers 74, 78 can be formed of any suitable magnetic material(s). The first and second plungers 74, 78 are formed of the magnetic material(s) for moving the first and second plungers 74, 78 in response to the magnetic fields. In other words, when the magnetic field is generated by the first coil 60, the first plunger 74 moves between the first and second positions. Likewise, when the magnetic field is generated by the second coil 62, the second plunger 78 moves between the third and fourth positions.

As mentioned above, the center plate 68 is disposed between the first and second coils 60, 62 for guiding the magnetic field generated by the first coil 60. More specifically, the first and second brackets 70, 72, as well as the center plate 68 and the first and second plates 69, 71 cooperate to guide the magnetic field when the first and/or second coils 60, 62 are in the energized state. Hence, the first bracket 70, the center plate 68, and the first and second plates 69, 71 cooperate to guide or focus the magnetic field through the first gap 76 when the first coil 60 is in the energized state, thus causing the first plunger 74 to move. Likewise, the second bracket 72, the center plate 68, and the first and second plates 69, 71 cooperate to guide or focus the magnetic field through the second gap 80 when the second coil 62 is in the energized state, thus causing the second plunger 78 to move. It is to be appreciated that the magnetic field generated by the first and second coils 60, 62 can attract the first and second plungers 74, 78 respectively (paramagnetism). It is to further be appreciated that the magnetic field generated by the first and second coils 60, 62 can repel the first and second plungers 74, 78 respectively (diamagnetism).

Turning to FIGS. 9-12, the first and second plungers 74, 78 each define an outer surface 82. More specifically, the outer surface 82 of the first and second plungers 74, 78 each include a shoulder 84 to define a first outer diameter $OD_1$ and a second outer diameter $OD_2$ less than the first outer diameter $OD_1$, which will be discussed further below.

Also referring to FIGS. 4-8, the solenoid valve assembly 30 also includes a dampener 86 coupled to one of the first support 48 and the first plunger 74 to prevent direct engagement between the first support 48 and the first plunger 74 as the first plunger 74 moves between the first and second positions during the energized and de-energized states for reducing noise during operation. More specifically, the dampener 86 is coupled to one of the first support 48 and the first plunger 74 adjacent the first gap 76 to prevent direct engagement between the first support 48 and the first plunger 74 as the first plunger 74 moves between the first and second positions during the energized and de-energized states for reducing noise during operation. The dampener 86 prevents direct engagement between the first support 48 and the first plunger 74 and maintains the first gap 76 between the first plunger 74 and the first support 48 which allows the first plunger 74 to move more freely. It is to be appreciated that the dampener 86 can be coupled to the first bracket 70.

In one embodiment, the dampener 86 is attached to the first support 48. In one configuration, the dampener 86 is attached to the first support 48 in the first recess 52. The dampener 86 is disposed in the first recess 52 adjacent the first bracket 70. The dampener 86 defines a hole 88 adjacent the first bore 50 with the first plunger 74 disposed in the hole 88. Further, the hole 88 of the dampener 86 is disposed along the longitudinal axis L. The first plunger 74 moves through the hole 88 between the first and second positions.

In another embodiment, the dampener 86 is attached to the first plunger 74. As such, the hole 88 is adjacent the first bore 50 with the first plunger 74 and the dampener 86 moving concurrently through the first bore 50. Specifically, the dampener 86 is attached to the outer surface 82 of the first plunger 74, and more specifically, the dampener 86 is attached to the outer surface 82 defining the first outer diameter $OD_1$. It is to be appreciated that the dampener 86 can be attached to the first support 48, the first plunger 74, or the first bracket 70 by a molding, such as injecting molding, adhesive, press fit, fasteners, welding, or any other suitable method for securing/attaching the dampener 86 thereon. It is to further be appreciated that in one configuration, the dampener 86 can be defined as an o-ring. The dampener 86 is further defined as a first dampener 86 for the below discussion.

The first dampener 86 includes a lip 90 extending radially toward the first plunger 74 for maintaining the first gap 76 between the first support 48 and the first plunger 74 as the first plunger 74 moves between the first and second positions during the energized and de-energized states. Further, the lip 90 extends radially toward the longitudinal axis L for maintaining the first gap 76 between the first support 48 and the first plunger 74 as the first plunger 74 moves between the first and second positions during the energized and de-energized states.

Optionally, the first dampener 86 includes a tab 92 extending outwardly away from the lip 90. The tab 92 is utilized for manufacturing of the first dampener 86. If desired, the tab 92 can maintain an orientation or position of the first dampener 86. Further, if desired, the tab 92 can assist in removing the first dampener 86 from the first support 48. It is to be appreciated that the first recess 52 is also complementary to the configuration of the tab 92 of the first recess 52.

The solenoid valve assembly 30 can further include a second first dampener 94 coupled to one of the second support 54 and the second plunger 78 adjacent the second gap 80 to prevent direct engagement between the second support 54 and the second plunger 78 as the second plunger 78 moves between the third and fourth positions during the energized and de-energized states. Hence, the second first dampener 94 prevents direct engagement between the second support 54 and the second plunger 78 and maintains the second gap 80 between the second plunger 78 and the second support 54 which allows the second plunger 78 to move more freely. It is to be appreciated that the second first dampener 94 can be coupled to the second bracket 72. It is to further be appreciated that the second first dampener 94 can be attached to the second support 54, the second plunger 78, or the second bracket 72 by a molding, such as injecting molding, adhesive, press fit, fasteners, welding, or any other suitable method for securing/attaching the second first dampener 94 thereon. The second first dampener 94 is a mirror image of the first dampener 86, and therefore, also includes the lip 90, the hole 88, and optionally the tab 92 as discussed above and therefore will not be re-discussed. As such, it is to be appreciated that in one configuration, the second first dampener 94 can be defined as an o-ring. In addition, it is to be appreciated that the first dampener 86 and the second first dampener 94 can be different configurations from each other.

The solenoid valve assembly 30 also includes an armature 96 disposed in the first bore 50. In addition, the armature 96 is disposed in the second bore 56. The armature 96 is coupled to at least one of the first and second supports 48, 54 to prevent movement of the armature 96 in the first and/or second bores 50, 56. In one embodiment, the armature 96 is coupled to the first support 48 and in another embodiment the armature 96 is coupled to the second support 54. It is to be appreciated that the armature 96 can be coupled to both the first and second supports 48, 54.

The armature 96 can be formed of metal material(s) and more specifically magnetic material(s). In one embodiment, the metal material(s) of the armature 96 is further defined as steel. It is to be appreciated that the armature 96 can be formed of any suitable magnetic material(s). The armature 96 is formed of the magnetic material(s) for guiding the magnetic field generated by the first and/or second coils 60, 62.

The armature 96 includes a projection 98 for coupling the armature 96 to at least one of the first and second supports 48, 54 for preventing movement of the armature 96 in the first and/or second bores 50, 56. The projection 98 extends from the armature 96 away from the longitudinal axis L, and more specifically, the projection 98 extends radially about the armature 96. In one embodiment, the projection 98 is disposed in one of the first recesses 52 of the first support 48. For example, the projection 98 is disposed in the first recess 52 adjacent the center plate 68. It is to be appreciated that the projection 98 can be sandwiched between the first support 48 and the center plate 68. In another embodiment, the projection 98 is disposed in one of the second recesses 58 of the second support 54. For example, the projection 98 is disposed in the second recess 58 adjacent the center plate 68. It is to be appreciated that the projection 98 can be sandwiched between the second support 54 and the center plate 68. It is to further be appreciated that the projection 98 can be defined as a plurality of projections 98 with one of the projections 98 disposed in one of the first recesses 52 and another one of the projections 98 disposed in one of the second recesses 58. It is to further be appreciated that the projection 98 can be in any suitable location.

Further, the projection 98 provides a stop for the center plate 68 during assembling of the solenoid valve assembly 30. The armature 96 can also include an engagement surface adjacent the projection 98 for receiving the center plate 68. The center plate 68 is disposed over the engagement surface for securing the center plate 68 to the armature 96. The engagement surface can be knurled or any other suitable configuration.

In addition, the armature 96 includes a step 100 facing the first plunger 74. The step 100 is further defined as a first step 100 and will be referred to as the first step 100 in the following discussion. The armature 96 also includes a second step 102 facing the second plunger 78. The first step 100 of the armature 96 faces the shoulder 84 of the first plunger 74 and likewise, the second step 102 of the armature 96 faces the shoulder 84 of the second plunger 78.

The solenoid valve assembly 30 can further include a biasing member 104 engaging the first plunger 74 and the armature 96 for continuously biasing the first plunger 74 toward the first position. More specifically, the biasing member 104 engages the shoulder 84 of the first plunger 74 and the first step 100 of the armature 96 for continuously biasing the first plunger 74 toward the first position. The biasing member 104 is further defined as a first biasing member 104 and further includes a second biasing member 106 engaging the shoulder 84 of the second plunger 78 and the second step 102 of the armature 96 for continuously biasing the second plunger 78 toward the third position. It is to be appreciated that the first and second biasing members 104, 106 can be any suitable configuration and location. For example, the first and/or second biasing members 104, 106 can be defined as a spring that either pushes or pulls the first and/or second plungers 74, 78 respectively. As another example, the first biasing member 104 can be configured such that the first biasing member 104 continuously bias the first plunger 74 to the second position, and likewise, the second biasing member 106 can be configured such that the second biasing member 106 continuously bias the second plunger 78 to the fourth position.

The armature 96 further includes a first distal end 108 and a second distal end 110 spaced from each other along the longitudinal axis L. The first step 100 is disposed adjacent the first distal end 108 and the second step 102 is disposed adjacent the second distal end 110. The first and second distal ends 108, 110 each include a flat surface 112 and a taper 114. The taper 114 of the first distal end 108 slopes upwardly toward the first step 100 and the taper 114 of the second distal end 110 slopes upwardly toward the second step 102. In other words, the taper 114 of the first distal end 108 slopes away from the longitudinal axis L toward the first step 100 and the taper 114 of the second distal end 110 slopes away from the longitudinal axis L toward the second step 102. It is to be appreciated that the first and second distal ends 108, 110 of the armature 96 are mirror images of each other. It is to further be appreciated that the first and second distal ends 108, 110 of the armature 96 can be different configurations from each other.

The armature 96 also defines a hollow 116 along the longitudinal axis L. The hollow 116 is disposed through the armature 96 between the first and second distal ends 108, 110. More specifically, the hollow 116 is disposed through the armature 96 and the flat surface 112 of the first and second distal ends 108, 110. The hollow 116 is spaced from the taper 114 of the first and second distal ends 108, 110. It is to be appreciated that the armature 96 can be any suitable configuration.

The first and second plungers 74, 78 each include a first end 118 facing the housing 32 and a second end 120 spaced from the first end 118 and facing the armature 96. More specifically, the second end 120 of the first plunger 74 faces the first distal end 108 of the armature 96 and the second end 120 of the second plunger 78 faces the second distal end 110 of the armature 96. Further, the first end 118 of the first plunger 74 faces the first aperture 38 of the first port 36 and the first end 118 of the second plunger 78 faces the third aperture 46 of the third port 44.

The first and second plungers 74, 78 each include a first flange 122 and a second flange 124 spaced from each other to define a groove 126 between the first and second flanges 122, 124. The shoulder 84 of the first plunger 74 is spaced from the first and second flanges 122, 124 of the first plunger 74 with the first outer diameter $OD_1$ adjacent the second flange 124 of the first plunger 74. In addition, the shoulder 84 of the second plunger 78 is spaced from the first and second flanges 122, 124 of the second plunger 78 with the first outer diameter $OD_1$ adjacent the second flange 124 of the second plunger 78. The first flange 122 of the first plunger 74 engages the housing 32 when in the first position and the first flange 122 of the second plunger 78 engages the housing 32 when in the third position. The first and second flanges 122, 124 of the first plunger 74 are disposed between the housing 32 and the first bracket 70. Likewise, the first and second flanges 122, 124 of the second plunger 78 are disposed between the housing 32 and the second bracket 72.

The solenoid valve assembly 30 can also include a second dampener 128 spaced from the first dampener 86. The second dampener 128 is coupled to one of the first and second ends 118, 120 of the first plunger 74 to prevent direct engagement between the first plunger 74 and one of the housing 32 and the armature 96 for reducing noise during operation. In one embodiment, the second dampener 128 is coupled to the first end 118 of the first plunger 74 such that the second dampener 128 engages the housing 32 when the first plunger 74 is in the first position. In other words, the second dampener 128 abuts the housing 32 when the first plunger 74 is in the first position. As such, a portion of the second dampener 128 is sandwiched between the housing 32 and the first flange 122 when the first plunger 74 is in the first position. Therefore, when in the first position, the second dampener 128 is disposed over the first aperture 38 of the first port 36 for preventing fluid from flowing into the cavity 34. In another embodiment, the second dampener 128 is coupled to the second end 120 of the first plunger 74 such that the second dampener 128 engages the armature 96 when the first plunger 74 is in the second position. Preferably, the second dampener 128 is coupled to the first end 118 of the first plunger 74. As such, the second dampener 128 is disposed over the first flange 122 of the first plunger 74. More specifically, the second dampener 128 covers the first flange 122 and is disposed in the groove 126 between the first and second flanges 122, 124 for attaching the second dampener 128 to the first end 118 of the first plunger 74.

The solenoid valve assembly 30 can further include a second second dampener 130 spaced from the second first dampener 94. The second second dampener 130 is coupled to one of the first and second ends 118, 120 of the second plunger 78 to prevent direct engagement between the second plunger 78 and one of the housing 32 and the armature 96 for reducing noise. In one embodiment, the second second dampener 130 is coupled to the first end 118 of the second plunger 78. In other words, the second second dampener 130 abuts the housing 32 when the second plunger 78 is in the third position. As such, a portion of the second second dampener 130 is sandwiched between the housing 32 and the first flange 122 when the second plunger 78 is in the third position. Therefore, when in the third position, the second second dampener 130 is disposed over the third aperture 46 of the third port 44 for preventing fluid from flowing out of the cavity 34 and out of the bladder 24. Preferably, the second second dampener 130 is coupled to the first end 118 of the second plunger 78. As such, the second second dampener 130 is disposed over the first flange 122 of the second plunger 78. More specifically, the second second dampener 130 covers the first flange 122 and is disposed in the groove 126 between the first and second flanges 122, 124 for attaching the second second dampener 130 to the first end 118 of the second plunger 78. It is to be appreciated that the second second dampener 130 is a mirror image of the second dampener 128. It is to further be appreciated that the second dampener 128 and the second second dampener 130 can be different configurations from each other.

The second end 120 of the first and second plungers 74, 78 each define a depression 132 extending toward the first end 118 respectively. The depression 132 of the first plunger 74 is generally complementary to the first distal end 108 of the armature 96 and the depression 132 of the second plunger 78 is generally complementary to the second distal end 110 of the armature 96. Specifically, the depression 132 of the first and second plungers 74, 78 each include an angled portion 134 complementary to the taper 114 of the first and second distal ends 108, 110 of the armature 96 respectively. The angled portion 134 of the first and second plungers 74, 78 cooperate with the taper 114 of the first and second distal ends 108, 110 of the armature 96 respectively for increasing an effective stroke of the first and second plungers 74, 78. The angled portion 134 of the first and second plungers 74, 78 overlap the taper 114 of the first and second distal ends 108, 110 of the armature 96, respectively. Therefore, a distance between the first plunger 74 and the armature 96 along the longitudinal axis L is decreased thus increasing the effective stroke of the first plunger 74 when the first coil 60 is in the energized state. Likewise, a distance between the second plunger 78 and the armature 96 along the longitudinal axis L is decreased thus increasing the effective stroke of the second plunger 78 when the second coil 62 is in the energized state. In addition, the depression 132 of the first and second plungers 74, 78 each include a cradle 136 adjacent the angled portion 134 with a portion of the cradle 136 complementary to the flat surface 112 of the first and second distal ends 108, 110 of the armature 96 respectively.

In addition, the first and second plungers 74, 78 each define a chamber 138 facing the hollow 116 of the armature 96. More specifically, the chamber 138 of the first plunger 74 extends from the second end 120 toward the first end 118 of the first plunger 74. Likewise, the chamber 138 of the second plunger 78 extends from the second end 120 toward the first end 118 of the second plunger 78. It is to be appreciated that the first and second plungers 74, 78 can be any suitable configuration.

The solenoid valve assembly 30 can further include a guide 140 attached to the first plunger 74 such that the guide 140 moves concurrently with the first plunger 74 between the first and second positions. The guide 140 is further defined as a first guide 140 and will be referred to as the first guide 140 in the below discussion. The solenoid valve assembly 30 further includes a second guide 142 attached to the second plunger 78 such that the second guide 142 moves concurrently with the second plunger 78 between the third and fourth positions. The chamber 138 of the first plunger 74 and the hollow 116 of the armature 96 receive the first guide 140. Likewise, the chamber 138 of the second plunger 78 and the hollow 116 of the armature 96 receive the second guide 142. The first guide 140 can be press fit to the chamber 138 of the first plunger 74 and the second guide 142 can be press fit to the chamber 138 of the second plunger 78. It is to be appreciated that the first and second guides 140, 142 can be attached to the first and second plungers 74, 78 respectively by any suitable method, such as for example, adhesive, welding, fasteners, friction/press fit, etc.

The first guide 140 generally guides the first plunger 74 along the longitudinal axis L during movement between the first and second positions. Likewise, the second guide 142 generally guides 140 the second plunger 78 along the longitudinal axis L during movement between the third and fourth positions. The first and second guides 140, 142 each define a length. Increasing the length of the first and second guides 140, 142 provide better guiding of the first and second plungers 74, 78.

The hollow 116 of the armature 96 is configured to guide the first and second guides 140, 142 during movement of the first and second plungers 74, 78 respectively. As best shown in FIG. 14, the hollow 116 of the armature 96 defines a first inner diameter $ID_1$ a second inner diameter $ID_2$ adjacent the first inner diameter $ID_1$, and a third inner diameter $ID_3$ with the second inner diameter $ID_2$ disposed between the first and third inner diameters $ID_1$, $ID_3$. The second and third inner diameters $ID_2$, $ID_3$ are greater than the first inner diameter $ID_1$. The second inner diameter $ID_2$ is less than the third inner diameter $ID_3$ with the first guide 140 configured to be movable in the second and third inner diameters $ID_2$, $ID_3$. As such, the first guide 140 cannot enter the first inner diameter $ID_1$.

The hollow 116 of the armature 96 also defines a fourth inner diameter $ID_4$ adjacent the first inner diameter $ID_1$ and spaced from the second and third inner diameters $ID_2$, $ID_3$.

In addition, the hollow 116 of the armature 96 defines a fifth inner diameter $ID_5$ with the fourth inner diameter $ID_4$ disposed between the first and fifth inner diameters $ID_1$, $ID_5$. The fourth and fifth inner diameters $ID_4$, $ID_5$ are greater than the first inner diameter $ID_1$. The fourth inner diameter $ID_4$ is less than the fifth inner diameter $ID_5$ with the second guide 142 configured to be movable in the fourth and fifth inner diameters $ID_4$, $ID_5$. As such, the second guide 142 cannot enter the first inner diameter $ID_1$.

The third inner diameter $ID_3$ provides less guidance to the first guide 140 than the second inner diameter $ID_2$ because of the third inner diameter $ID_3$ is greater than the second inner diameter $ID_2$. The second inner diameter $ID_2$ provides the most guidance because the second inner diameter $ID_2$ is closer to an outer diameter of the first guide 140. Likewise, the fifth diameter $ID_5$ provides less guidance to the second guide 142 than the fourth inner diameter $ID_4$ because of the fifth inner diameter $ID_5$ is greater than the fourth inner diameter $ID_4$. The fourth inner diameter $ID_4$ provides the most guidance because the fourth inner diameter $ID_4$ is closer to an outer diameter of the second guide 142.

As suggested above, the third and fifth inner diameters $ID_3$, $ID_5$ allow the first and second guides 140, 142 respectively to move transverse to the longitudinal axis L. In addition, the second and fourth inner diameters $ID_2$, $ID_4$ allow the first and second guides 140, 142 respectively to move transverse to the longitudinal axis L. In other words, the first and second guides 140, 142 are spaced from a portion of the hollow 116 to allow the first and second guides 140, 142 to move off-center from the longitudinal axis L. It is to be appreciated that the first and second guides 140, 142 can further be defined as elongated pins. It is to further be appreciated that the first and second guides 140, 142 can be any suitable configuration for guiding the first and second plungers 74, 78 respectively. In addition, it is to be appreciated that the first and second guides 140, 142 can be attached to the armature 96 such that the first plunger 74 moves relative to the first guide 140 and the second plunger 78 moves relative to the second guide 142. The first and second guides 140, 142 are each formed of metal material(s) and more specifically non-magnetic material(s). In one embodiment, the metal material(s) of the first and second guides 140, 142 is further defined as brass. It is to be appreciated that the first and second guides 140, 142 can be formed of any suitable non-magnetic material(s).

Turning back to FIGS. 4-8, the solenoid valve assembly 30 can further include a third dampener 144 coupled to the second end 120 of the first plunger 74. As such, the second dampener 128 prevents direct engagement between the first plunger 74 and the housing 32 and the third dampener 144 prevents direct engagement between the first plunger 74 and the armature 96. Specifically, the third dampener 144 is disposed in the cradle 136 of the depression 132 of the second end 120 of the first plunger 74. When the first plunger 74 moves to the second position, the third dampener 144 is sandwiched between the second end 120 of the first plunger 74 and the first distal end 108 of the armature 96. More specifically, when the first plunger 74 moves to the second position, the third dampener 144 is sandwiched between the cradle 136 of the depression 132 of the first plunger 74 and the flat surface 112 of the first distal end 108 of the armature 96. In one embodiment, the third dampener 144 is attached to the first guide 140. It is to be appreciated that the third dampener 144 can be attached to the armature 96.

The solenoid valve assembly 30 can further include a second third dampener 146 coupled to the second end 120 of the second plunger 78. As such, the second second dampener 130 prevents direct engagement between the second plunger 78 and the housing 32 and the second third dampener 146 prevents direct engagement between the second plunger 78 and the armature 96. Specifically, the second third dampener 146 is disposed in the cradle 136 of the depression 132 of the second end 120 of the second plunger 78. When the second plunger 78 moves to the fourth position, the second third dampener 146 is sandwiched between the second end 120 of the second plunger 78 and the second distal end 110 of the armature 96. More specifically, when the second plunger 78 moves to the fourth position, the second third dampener 146 is sandwiched between the cradle 136 of the depression 132 of the second plunger 78 and the flat surface 112 of the second distal end 110 of the armature 96. In one embodiment, the second third dampener 146 is attached to the second guide 142. It is to be appreciated that the second third dampener 146 can be attached to the armature 96. It is to be appreciated that the second third dampener 146 is a mirror image of the third dampener 144. It is to further be appreciated that the third dampener 144 and the second third dampener 146 can be different configurations from each other.

All of the dampeners 86, 94, 128, 130, 144, 146, as discussed above, can be formed of polymeric material(s) and more specifically plastic material(s). The plastic material(s) of the dampeners 86, 94, 128, 130, 144, 146 can be thermoplastic material(s) and/or thermoset material(s). In one embodiment, the polymeric material(s) of the dampeners 86, 94, 128, 130, 144, 146 is further defined as silicon. In another embodiment, the polymeric material(s) of the dampeners 86, 94, 128, 130, 144, 146 is further defined as thermoplastic elastomers (TPE). It is to be appreciated that one or more of the dampeners 86, 94, 128, 130, 144, 146 can be formed of silicon and one or more the dampeners 86, 94, 128, 130, 144, 146 can be formed of TPE. It is to further be appreciated that the dampeners 86, 94, 128, 130, 144, 146 can be formed of any suitable material(s).

As shown in FIG. 1, it is to be appreciated that the solenoid valve assembly 30 can be further defined a plurality of solenoid valve assemblies 30. The solenoid valve assemblies 30 can be coupled to each other in a row with each solenoid valve assembly 30 controlling one bladder 24. The housing 32 of each solenoid valve assembly 30 defines a path 148 adjacent the first aperture 38 of the first port 36, and more specifically, the path 148 is in fluid communication with the first aperture 38. The path 148 of each of the solenoid valve assemblies 30 cooperate with each other for guiding the fluid from one solenoid valve assembly 30 to the next for selectively inflating the desired bladder(s) 24. It is to be appreciated that the solenoid valve assemblies 30 can be grouped together in various locations.

For illustrative purposes only, the operation of the seat assembly 20 is discussed below. For the description of the operation, the pump 26 is turned on to flow fluid down the path 148 of the solenoid valve assemblies 30. Below, the function of one solenoid valve assembly 30 will be discussed in relation to inflating and deflating one bladder 24. Further, for this discussion, initially, the first plunger 74 is disposed in the first position and the second plunger 78 is disposed in the third position such that no fluid flows into or out of the cavity 34 of the housing 32. In other words, the second dampener 128 engages the housing 32 over the first aperture 38 for preventing fluid from flowing into the cavity 34 and the second second dampener 130 engages the housing 32 over the third aperture 46 for preventing fluid from flowing out of the cavity 34 and out of the bladder 24.

To inflate the bladder 24, the second plunger 78 remains in the third position. The user engages a first switch (not shown) and current flows through one pair of the wires 66 to the first coil 60 such that the first coil 60 is energized to the energized state, thus generating the magnetic field. The first bracket 70, the center plate 68, and the first and second plates 69, 71 cooperate to guide the magnetic field through the first gap 76 when the first coil 60 is in the energized state, thus causing the first plunger 74 to move. The first plunger 74 moves away from the housing 32 to the second position in response to the magnetic field being generated. The magnetic field is strong enough to overcome a biasing force of the first biasing member 104 to move the first plunger 74 to the second position.

Figure 10:
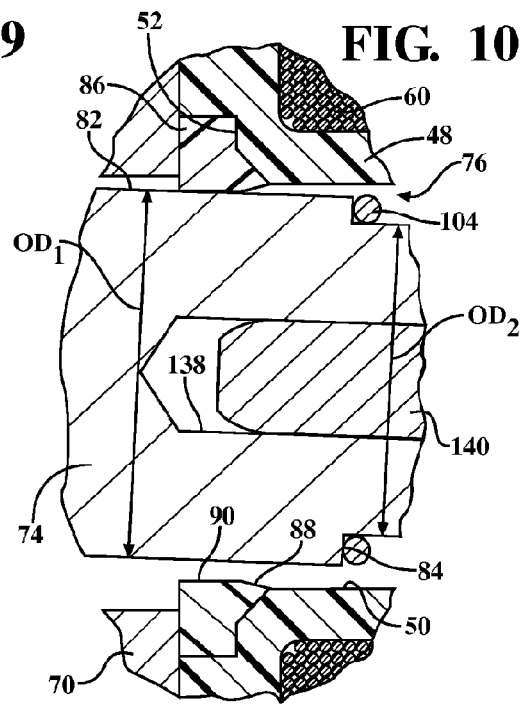
FIG. 10 is a cross-sectional view of the first plunger engaging the first dampener taken from FIG. 7.

During this movement, the first plunger 74 moves off-center from the longitudinal axis L as shown in FIGS. 7 and 10. In other words, the magnetic field pulls the first plunger 74 transverse to the longitudinal axis L. This off-center movement causes the first plunger 74 to engage or compress a portion of the first dampener 86 thus preventing direct contact between the first plunger 74 and the first support 48 and reducing noise during operation of the first plunger 74. For example, the first plunger 74 engages the lip 90 of the first dampener 86. The first plunger 74 can engage the first dampener 86 in any transverse direction to the longitudinal axis L. In other words, the magnetic field can cause the first plunger 74 to move off-center relative to the longitudinal axis L in any direction. It is to be appreciated that the off-center movement can be so small that the first plunger 74 does not engage the first dampener 86. Once the first plunger 74 disengages from the housing 32, fluid flows into the cavity 34 of the housing 32, through the second aperture 42 of the second port 40, and into the bladder 24 to inflate the bladder 24 to the inflate position. It is to be appreciated that if tube(s) 28 are being utilized, fluid will also flow through one or more tube(s) 28.

When the first plunger 74 is in the second position, the third dampener 144 is sandwiched or compressed between the second end 120 of the first plunger 74 and the first distal end 108 of the armature 96 for preventing direct contact between the first plunger 74 and the armature 96 for reducing noise during operation of the first plunger 74. When the bladder 24 is inflated to a desired amount, the user disengages the first switch and current stops flowing through the pair of the wires 66 to the first coil 60 such that the first coil 60 is in the de-energized state and no magnetic field is generated. Therefore, when the first coil 60 is de-energized, the first biasing member 104 biases the first plunger 74 back to the first position such that the second dampener 128 engages the housing 32 over the first aperture 38 for preventing fluid from flowing into the cavity 34. In other words, the second dampener 128 is sandwiched or compressed between the housing 32 and the first flange 122 of the first plunger 74 and the third dampener 144 is de-compressed.

To deflate the bladder 24, the first plunger 74 remains in the first position. The user engages a second switch (not shown) and current flows through another pair of the wires 66 to the second coil 62 such that the second coil 62 is energized to the energized state, thus generating the magnetic field. The second bracket 72, the center plate 68, and the first and second plates 69, 71 cooperate to guide the magnetic field through the second gap 80 when the second coil 62 is in the energized state, thus causing the second plunger 78 to move. The second plunger 78 moves away from the housing 32 to the fourth position in response to the magnetic field being generated. The magnetic field is strong enough to overcome a biasing force of the second biasing member 106 to move the second plunger 78 to the fourth position.

Figure 8:
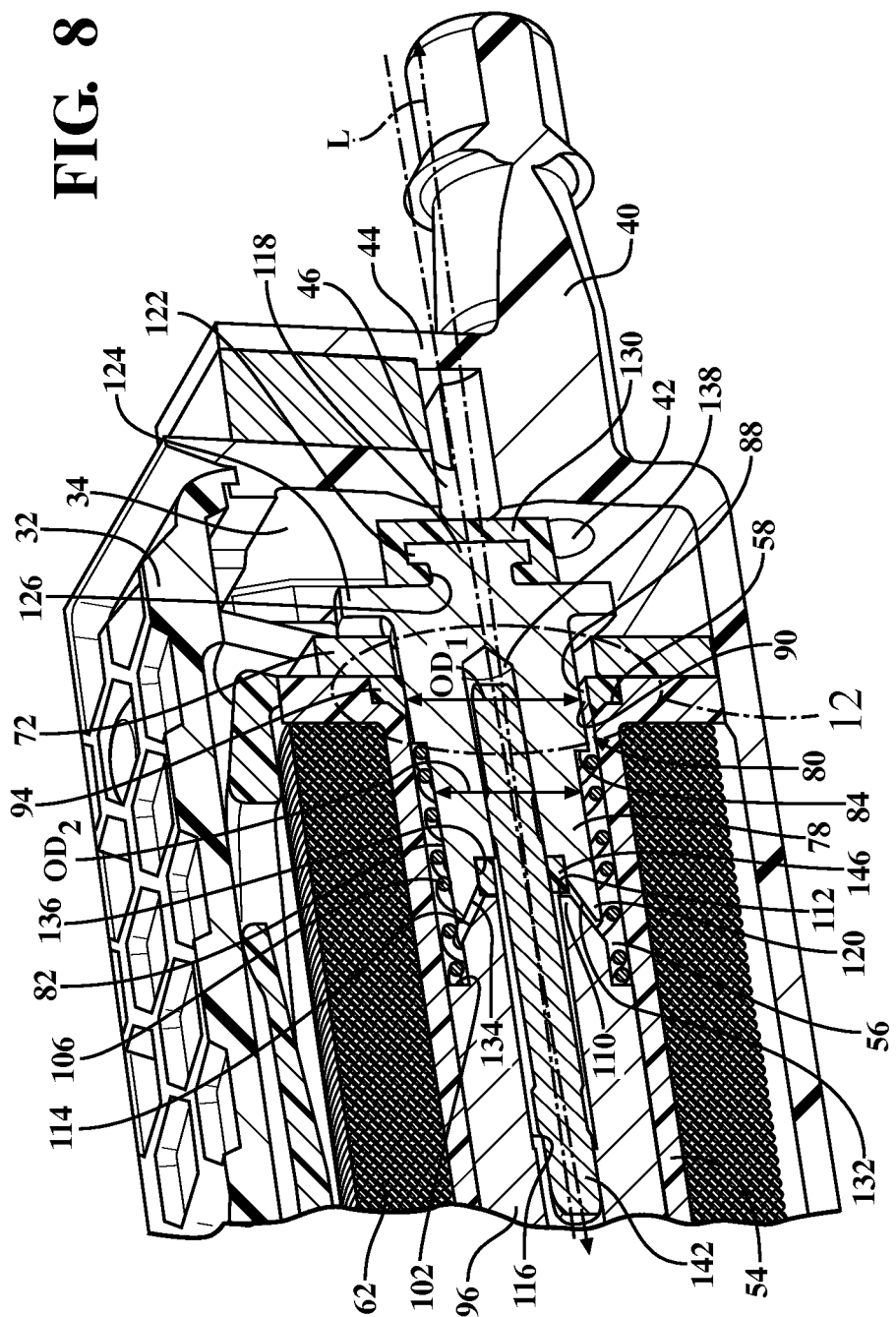
FIG. 8 is a perspective cross-sectional view of the second plunger in a fourth position.
Figure 12:
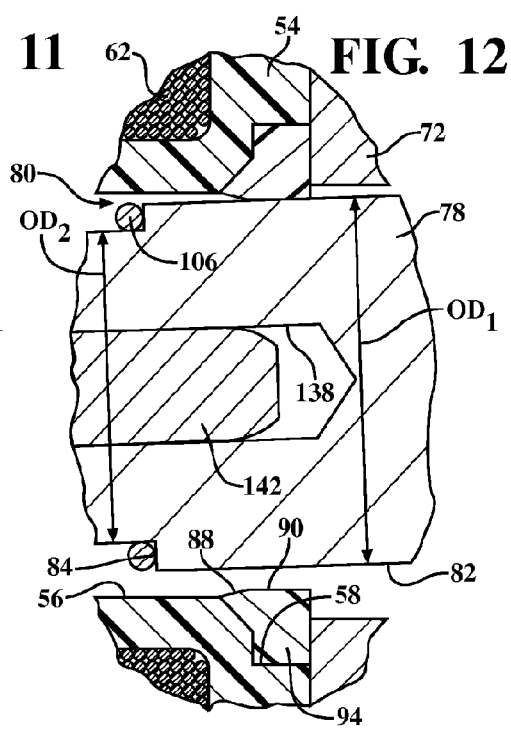
FIG. 12 is a cross-sectional view of the second plunger engaging the second first dampener taken from FIG. 8.

During this movement, the second plunger 78 moves off-center from the longitudinal axis L as shown in FIGS. 8 and 12. In other words, the magnetic field pulls the second plunger 78 transverse to the longitudinal axis L. This off-center movement causes the second plunger 78 to engage or compress a portion of the second first dampener 94 thus preventing direct contact between the second plunger 78 and the second support 54 and reducing noise during operation of the second plunger 78. For example, the second first dampener 94 engages the lip 90 of the second first dampener 94. The second plunger 78 can engage the second first dampener 94 in any transverse direction to the longitudinal axis L. In other words, the magnetic field can cause the second plunger 78 to move off-center relative to the longitudinal axis L in any direction. It is to be appreciated that the off-center movement can be so small that the second plunger 78 does not engage the second first dampener 94. Once the second plunger 78 disengages from the housing 32, fluid flows out of the bladder 24, through the second aperture 42 of the second port 40, into the cavity 34 of the housing 32, and out the third aperture 46 of the third port 44 to deflate the bladder 24 to the deflate position. Again, it is to be appreciated that if tube(s) 28 are being utilized, fluid will also flow through one or more tubes 28.

When the second plunger 78 is in the fourth position, the second third dampener 146 is sandwiched or compressed between the second end 120 of the second plunger 78 and the second distal end 110 of the armature 96 for preventing direct contact between the second plunger 78 and the armature 96 for reducing noise during operation of the second plunger 78. When the bladder 24 is deflated to a desired amount, the user disengages the second switch and current stops flowing through the pair of the wires 66 to the second coil 62 such that the second coil 62 is in the de-energized state and no magnetic field is generated. Therefore, when the second coil 62 is de-energized, the second biasing member 106 biases the second plunger 78 back to the third position such that the second second dampener 130 engages the housing 32 over the third aperture 46 for preventing fluid from flowing out of the cavity 34 and out of the bladder 24. In other words, the second second dampener 130 is sandwiched or compressed between the housing 32 and the first flange 122 of the second plunger 78 and the second third dampener 146 is de-compressed.

It is to be appreciated that various components in various Figures have been exaggerated for illustrative purposes. For example, the first and second plungers 74, 78 and the first and second guides 140, 142 moving off-center from the longitudinal axis L in FIGS. 7, 8, 10, and 12 are exaggerated for illustrative purposes only.

Many modifications and variations of the present invention are possible in light of the above teachings. The foregoing invention has been described in accordance with the relevant legal standards; thus, the description is exemplary rather than limiting in nature. Variations and modifications to the disclosed embodiment can become apparent to those skilled in the art and do come within the scope of the invention. Accordingly, the scope of legal protection afforded this invention can only be determined by studying the following claims.

What is claimed is:

1. A solenoid valve assembly (30) comprising:
   a housing (32) defining a cavity (34);
   a support (48) disposed in said cavity (34) and defining a bore (50) along a longitudinal axis;
   a coil (60) disposed about said support (48) and defining an energized state for generating a magnetic field and a de-energized state;
   a plunger (74) moveably disposed in said bore (50) of said support (48) between a first position engaging said housing (32) and a second position spaced from said housing (32) with said plunger (74) radially spaced from said support (48) relative to said longitudinal axis to define a gap (76) between said plunger (74) and said support (48); and
   a dampener (86) attached to said support (48) adjacent said gap (76) with said dampener (86) extending into said gap (76) to define a space between said dampener (86) and said plunger (74) when in said first position with said dampener (86) at least partially maintaining said gap (76) to prevent direct engagement between said support (48) and said plunger (74) as said plunger (74) moves between said first and second positions during said energized and de-energized states for reducing noise during operation;
   wherein said dampener (86) is fixedly mounted to said support (48) and defines a hole (88) along said longitudinal axis with said plunger (74) disposed in said hole (88), and with an entire length of said plunger entirely spaced from said dampener in at least one of said first and second positions such that said plunger is not in contact with said dampener when said plunger is entirely spaced from said dampener.

2. A solenoid valve assembly (30) as set forth in claim 1 wherein said dampener (86) includes a lip (90) extending radially toward said longitudinal axis to further define said space and for maintaining said gap (76) between said support (48) and said plunger (74) as said plunger (74) moves between said first and second positions during said energized and de-energized states.

3. A solenoid valve assembly (30) as set forth in claim 2 wherein said dampener (86) includes a tab (92) extending outwardly away from said lip (90).

4. A solenoid valve assembly (30) as set forth in claim 1 wherein said support (48) defines a recess (52) with said dampener (86) attached to said support (48) in said recess (52).

5. A solenoid valve assembly (30) according to claim 1 and further comprising:
   an armature (96) disposed in said bore (50) and coupled to said support (48) to prevent movement of said armature (96) in said bore (50);
   said plunger (74) including a first end (118) facing said housing (32) and a second end spaced from said first end (118) and facing said armature (96); and
   a second dampener (128) spaced from said first dampener (86) and coupled to one of said first end (118) and second ends (120) of said plunger (74) to prevent direct engagement between said plunger (74) and one of said housing (32) and said armature (96) for reducing noise during operation.

6. A solenoid valve assembly (30) as set forth in claim 5 wherein said armature (96) includes a step (100) facing a shoulder (84) of said plunger (74) and further including a biasing member (104) engaging said shoulder (84) and said step (100) for continuously biasing said plunger (74) toward said first position.

7. A solenoid valve assembly (30) as set forth in claim 5 wherein said second dampener (128) is coupled to said first end (118) of said plunger (74) and further including a third dampener (144) coupled to said second end (120) of said plunger (74) such that said second dampener (128) prevents direct engagement between said plunger (74) and said housing (32) and said third dampener (144) prevents direct engagement between said plunger (74) and said armature (96).

8. A solenoid valve assembly (30) as set forth in claim 7 further including a guide (140) attached to said plunger (74) such that said guide (140) moves concurrently with said plunger (74) between said first and second positions with said third dampener (144) attached to said guide (140).

9. A solenoid valve assembly (30) as set forth in claim 8 wherein said plunger (74) defines a chamber and said armature (96) defines a hollow (116) with said chamber and said hollow (116) receiving said guide (140).

10. A solenoid valve assembly (30) as set forth in claim 5 wherein said second dampener (128) is coupled to said first end (118) of said plunger (74) such that said second dampener (128) engages said housing (32) when said plunger (74) is in said first position.

11. A solenoid valve assembly (30) as set forth in claim 5 wherein said second dampener (128) is coupled to said second end (120) of said plunger (74) such that said second dampener (128) engages said armature (96) when said plunger (74) is in said second position.

12. A solenoid valve assembly (30) as set forth in claim 5 further including a biasing member (104) engaging said plunger (74) and said armature (96) for continuously biasing said plunger (74) toward said first position.

13. A seat assembly (20) for a vehicle including the solenoid valve assembly (30) according to claim 1, said seat assembly (20) comprising:
   a seat frame (22) mounted to said solenoid valve assembly (30); and
   a bladder (24) coupled to said seat frame (22) and coupled to said solenoid valve assembly (30) and defining an inflate position with said bladder (24) inflated and a deflate position with said bladder (24) deflated.

14. A seat assembly (20) as set forth in claim 13 wherein said housing (32) includes a first port (36) defining a first aperture (38) adjacent said cavity (34) with said plunger (74) preventing fluid communication between said cavity (34) and said first aperture (38) when in said first position and said plunger (74) allowing fluid communication between said cavity (34) and said first aperture (38) when in said second position.

15. A seat assembly (20) as set forth in claim 14 wherein said housing (32) includes a second port (40) adjacent said cavity (34) and spaced from said first port (36) with said bladder (24) coupled to said second port (40) and said second port (40) defining a second aperture (42) in fluid communication with said cavity (34) and said bladder (24) for inflating said bladder (24) to said inflate position and deflating said bladder (24) to said deflate position.

16. A seat assembly (20) as set forth in claim 13 wherein said plunger (74) is further defined as a first plunger (74), said gap (76) is further defined as a first gap (76), said support (48) is further defined as a first support (48), and said bore (50) is further defined as a first bore (50) and further including a second support (54) adjacent said first support (48) and defining a second bore (56) adjacent said first bore (50) and further including a second plunger (78) movably disposed in said second bore (56) of said second support (54) between a third position engaging said housing (32) and a fourth position spaced from said housing (32) with said second plunger (78) radially spaced from said second support (54) to define a second gap (80) between said second plunger (78) and said second support (54).

17. A seat assembly (20) as set forth in claim 16 wherein said coil (60) is further defined as a first coil (60) and said dampener (86) is further defined as a first dampener (86) and further including a second coil (62) disposed about said second support (54) and defining an energized state for generating a magnetic field and a de-energized state and further including a second first dampener (94) coupled to one of said second support (54) and said second plunger (78) adjacent said second gap (80) to prevent direct engagement between said second support (54) and said second plunger (78) as said second plunger (78) moves between said third and fourth positions during said energized and de-energized states.

18. A seat assembly (20) as set forth in claim 16 wherein said housing (32) includes a third port defining a third aperture (46) adjacent said cavity (34) with said second plunger (78) preventing fluid communication between said cavity (34) and said third aperture (46) when in said third position and said second plunger (78) allowing fluid communication between said cavity (34) and said third aperture (46) when in said fourth position.

19. A seat assembly (20) as set forth in claim 13 wherein said dampener (86) includes a lip (90) extending radially toward said plunger (74) for maintaining said gap (76) between said support (48) and said plunger (74) as said plunger (74) moves between said first and second positions during said energized and de-energized states.

20. A solenoid valve assembly (30) comprising:
a housing (32) defining a cavity (34);
a support (48) disposed in said cavity (34) and defining a bore (50) along a longitudinal axis;
a coil (60) disposed about said support (48) and defining an energized state for generating a magnetic field and a de-energized state;
a plunger (74) moveably disposed in said bore (50) of said support (48) between a first position engaging said housing (32) and a second position spaced from said housing (32) with said plunger (74) radially spaced from said support (48) relative to said longitudinal axis to define a gap (76) between said plunger (74) and said support (48); and
a dampener (86) attached to said plunger (74) adjacent said gap (76) with said dampener (86) extending into said gap (76) to define a space between said dampener (86) and said support (48) when in said first position with said dampener (86) at least partially maintaining said gap (76) to prevent direct engagement between said support (48) and said plunger (74) as said plunger (74) moves between said first and second positions during said energized and de-energized states for reducing noise during operation;
wherein said dampener (86) defines a hole (88) along said longitudinal axis with said plunger (74) disposed in said hole (88) such that said dampener (86) is fixedly mounted to said plunger (74) and moves with said plunger between said first and second positions.

21. A solenoid valve assembly (30) as set forth in claim 20 wherein said plunger (74) defines an outer surface (82) with said dampener (86) attached to said outer surface (82).

22. A solenoid valve assembly (30) as set forth in claim 21 wherein said outer surface (82) of said plunger (74) includes a shoulder (84) to define a first outer diameter and a second outer diameter less than said first outer diameter with said dampener (86) attached to said outer surface (82) defining said first outer diameter.

* * * * *